United States Patent
Kumar et al.

(10) Patent No.: US 8,330,825 B2
(45) Date of Patent: Dec. 11, 2012

(54) ZOOM LENS SYSTEM CHARACTERIZATION FOR IMAGE SHARPENING

(75) Inventors: Mrityunjay Kumar, Rochester, NY (US); Bruce H. Pillman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 343 days.

(21) Appl. No.: 12/709,797

(22) Filed: Feb. 22, 2010

(65) Prior Publication Data

US 2011/0205402 A1   Aug. 25, 2011

(51) Int. Cl.
*H04N 5/228* (2006.01)

(52) U.S. Cl. .......... 348/208.99; 348/208.4; 348/208.12; 348/252

(58) Field of Classification Search ............. 348/208.99, 348/208.4, 208.12, 252; 382/255, 263, 264
See application file for complete search history.

(56) References Cited

U.S. PATENT DOCUMENTS

| | | | |
|---|---|---|---|
| 6,356,304 B1 | 3/2002 | Kawaguchi et al. | |
| 6,628,329 B1 | 9/2003 | Kelly et al. | |
| 7,336,430 B2 | 2/2008 | George et al. | |
| 2006/0239549 A1* | 10/2006 | Kelly et al. | 382/167 |
| 2007/0036461 A1 | 2/2007 | Atherton | |

FOREIGN PATENT DOCUMENTS

EP   1954030   8/2008

OTHER PUBLICATIONS

Gonzalez et al., "Digital Image Processing Using MATLAB," Pearson Prentice Hall, Upper Saddle River, NJ, 2004.

* cited by examiner

*Primary Examiner* — Yogesh Aggarwal

(74) *Attorney, Agent, or Firm* — Kevin E. Spaulding

(57) ABSTRACT

A method for sharpening an input digital image captured using a digital camera having a zoom lens, determining a parameterized representation of lens acuity of the zoom lens as a function of at least the lens focal length and lens F# by fitting a parameterized function to lens acuity data for the zoom lens at a plurality of lens focal length and lens F/#; using a processor to sharpen the input digital image responsive to the particular lens focal length and lens F/#corresponding to the input digital image using the parameterized representation of the lens acuity.

24 Claims, 9 Drawing Sheets

ZOOM LENS SYSTEM CHARACTERIZATION FOR IMAGE SHARPENING

FIELD OF THE INVENTION

This invention relates generally to the field of enhancing digital images, and more particularly to a method to sharpen digital images captured using a digital camera having a zoom lens.

BACKGROUND OF THE INVENTION

Restoration of images blurred due to the point spread function of the lens of a digital camera is an important problem in signal processing. Conventional image restoration algorithms exploit known point spread function information to sharpen the blurred image. Typically, the lens point spread function is derived from the modulation transfer function (MTF) or the optical transfer function (OTF) of the lens. In the absence of any knowledge of the MTF or OTF, the point spread function can be estimated from the blurred image itself. This approach is known as blind deblurring. Therefore, point spread function estimation is a key step in image restoration algorithms.

A parametric form for the lens MTF is highly desirable as it can be implemented efficiently in the memory constraint hardware architecture of the digital cameras. A closed-form equation for the diffraction-limited lens modulation transfer function is well known. However, it is extremely complicated to develop a closed-form equation for the MTF of a real zoom lens system, particularly a zoom lens having a combination of several lens elements where the MTF will be influenced by several optical parameters including focal length, F-number (F/#) and focus distance. Therefore, it is generally necessary to rely on measurement based methods, or computer models that can predict the lens characteristics.

Sean et al., in U.S. Pat. No. 6,628,329, entitled "Correction of Position Dependent Blur in a Digital Image," describes a method for calibration of MTF correction. The method involves capturing a target with many MTF features (e.g., slanted edges), and computes a grid of spatially varying sharpening kernels to compensate. However, the requirement to store a plurality of sharpening kernels is memory intensive and cannot easily be extended to zoom lens configurations.

In U.S. Patent Application Publication 2007/0036461, entitled "Correction Deconvolution of a Digital Image", Timothy describes a method to restore a defocused image using a parametric equation for the OTF of a diffraction-limited lens. However, the method is only applicable to fixed-focal length diffraction limited lenses.

Naoki et al., in U.S. Pat. No. 6,356,304, entitled "Method for Processing Video Signal and Apparatus for Processing Video Signal," describes a method for controlling the aperture of a digital camera, and controls sharpening gain depending on the aperture setting.

European Patent Application Publication EP1954030A1 to Hatori et al., entitled "Image Pickup Apparatus and Image Processing Method," discloses selecting a deblurring filter from a stored set of deblurring filters based on focal length and subject distance.

Thus, there exists a need for an efficient method for characterizing the MTF of a zoom lens which can subsequently be used to sharpen blurred images captured under a variety of zoom and aperture conditions.

SUMMARY OF THE INVENTION

The present invention represents a method for sharpening an input digital image captured using a digital camera having a zoom lens, comprising:

a) determining a parameterized representation of lens acuity for the zoom lens as a function of at least the lens focal length and the lens F/# by fitting a parameterized function to lens acuity data for the zoom lens at a plurality of lens focal lengths and lens F/#s;

b) using the digital camera to capture a digital image of a scene at a particular lens focal length and lens F/#;

c) using a processor to sharpen the captured digital image responsive to the particular lens focal length and lens F/# using the parameterized representation of the lens acuity; and d) storing the sharpened digital image in a processor-accessible memory system.

It is an advantage that the modulation transfer function of the zoom lens can be generated from the parameterized representation of its acuity using only a few optical parameters e.g. focal length, F/# and focus distance.

Furthermore, the parameterized representation of the lens acuity can be used to model center as well corner modulation transfer function, which facilitates spatially-varying deblurring.

It is an advantage of the proposed approach that the parameterized representation of the lens acuity exploits well-behaved and smooth parametric functions, and hence is robust to the measurement noise incurred during image acquisition.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting.

The phrase, "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
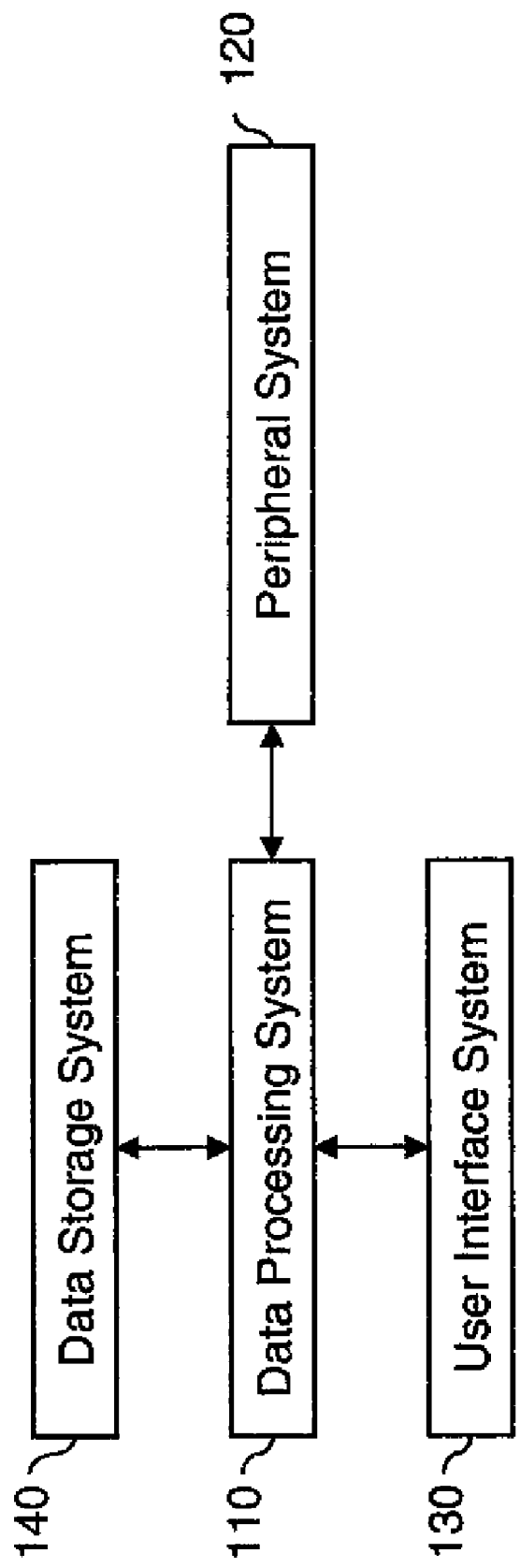
FIG. 1 is a high-level diagram showing the components of a system for sharpening digital image according to an embodiment of the present invention.

FIG. 1 is a high-level diagram showing the components of a system for image sharpening according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes of FIGS. 2-9 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes of FIGS. 2-9 described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated.

The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
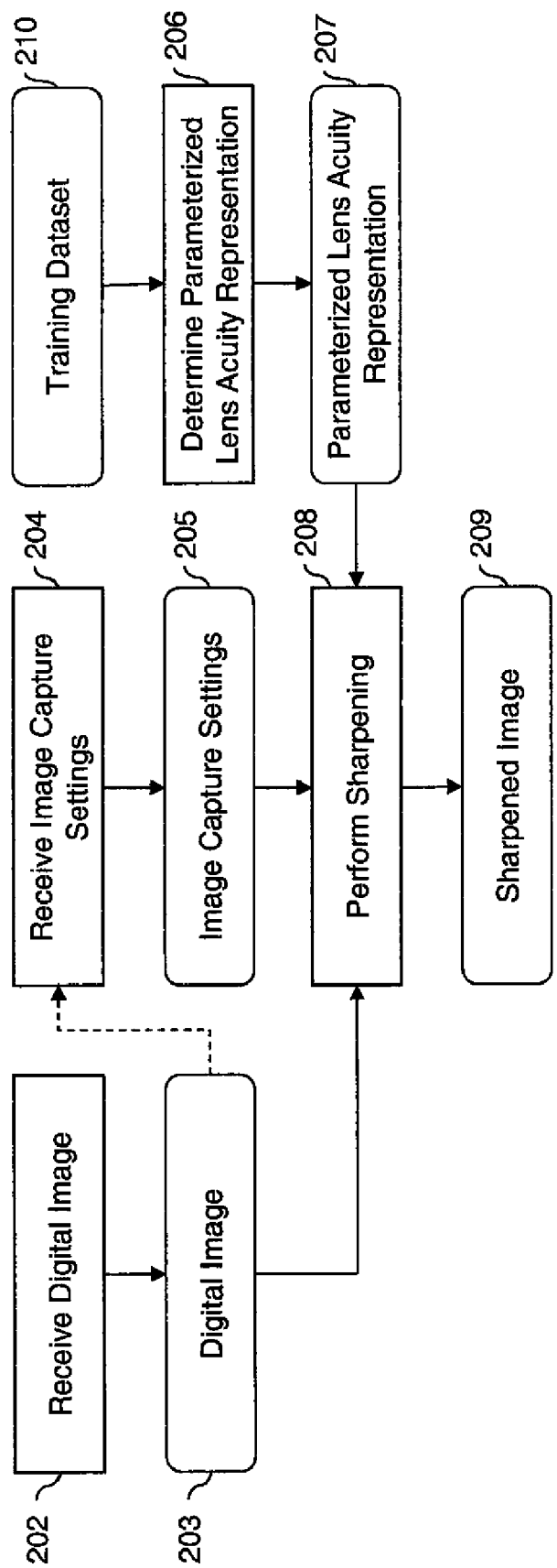
FIG. 2 is a flow diagram illustrating a method for sharpening digital images according to an embodiment of the present invention.

FIG. 2 is a flow diagram illustrating a method for sharpening digital images according to an embodiment of the present invention. A digital image 203 representing a scene is received in receive digital image step 202. The digital image 203 can be captured by a digital camera having a zoom lens or it may be a frame of a video sequence captured by a zoom lens video camera.

Image capture settings 205 are received in receive image capture settings step 204. The image capture settings 205 contain information about various camera settings such as lens focal length, lens F/# and focus distance, that were used to capture the digital image 203. In one embodiment of the present invention, the image capture settings 205 are stored as metadata in a digital image file containing the digital image 203. In this case, the receive image capture settings step 204 works by extracting the image capture settings 205 from the digital image file.

A parameterized lens acuity representation 207 is determined in a determine parameterized lens acuity representation step 206 responsive to training dataset 210. The parameterized lens acuity representation 207 represents parametric form of zoom lens acuity as a function of camera settings such as lens focal length, lens F/# and focus distance. A sharpened image 209, representing a sharpened version of digital image 203, is determined with a perform sharpening step 208. The perform sharpening step 208 uses the digital image 203, the image capture settings 205, and the parameterized lens acuity representation 207 to produce the sharpened image 209.

Figure 3:
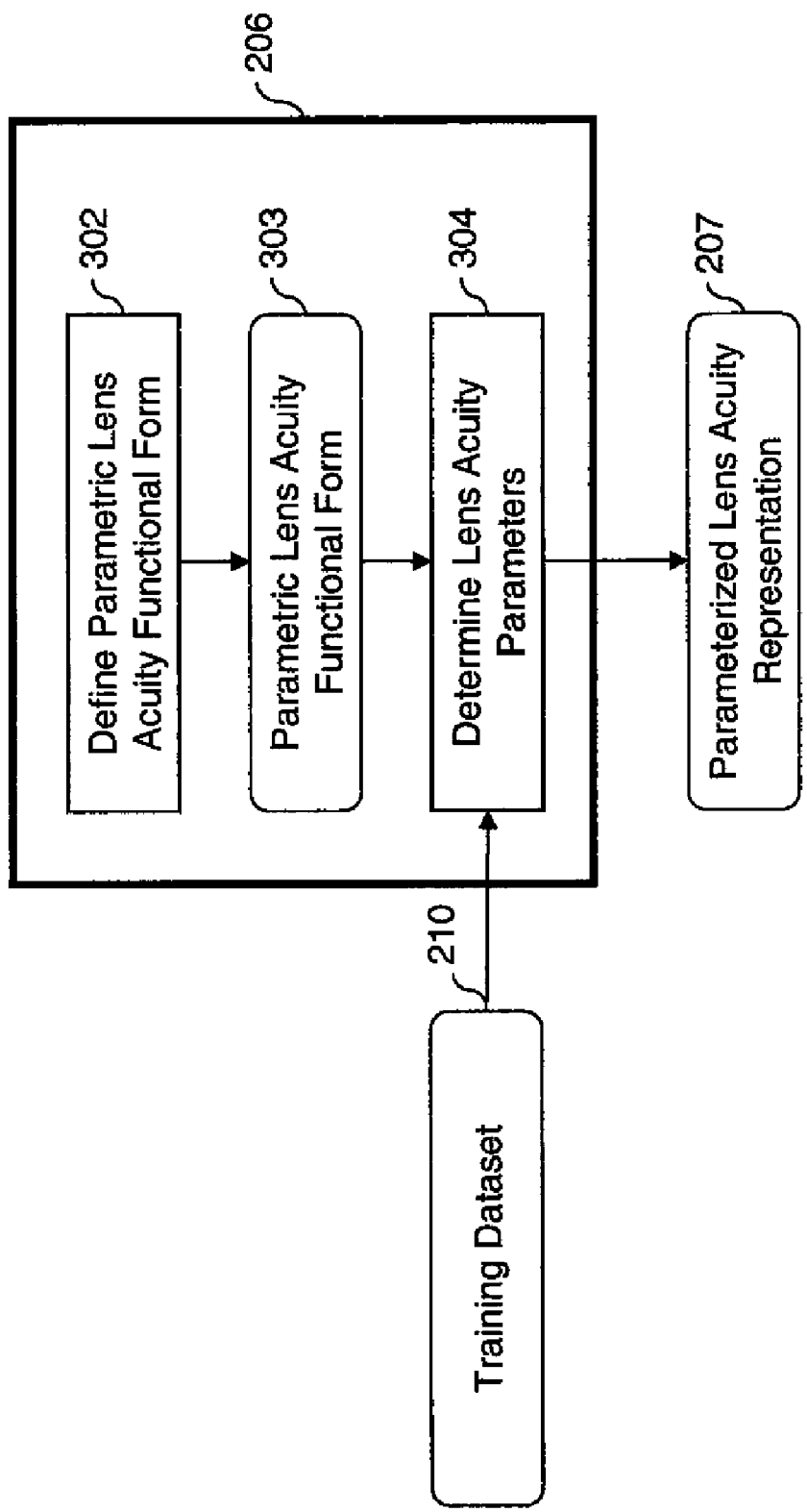
FIG. 3 is a block diagram showing a detailed view of the determine parameterized lens acuity representation step of FIG. 2.

The individual steps outlined in FIG. 2 will now be described in greater detail. FIG. 3 is a more detailed view of the determine parameterized lens acuity representation step 206 shown in FIG. 2 according to a preferred embodiment of the present invention. A define parametric lens acuity functional form step 302 is used to define a parametric lens acuity functional form 303. The parametric lens acuity functional form 303 is a function that can be used to model the lens acuity. The parametric lens acuity functional form 303 will have a series of inputs corresponding to various image capture settings 205 such as the lens focal length, F/# and focal distance. Optionally, the parameterized lens acuity representation 207 can also be a function of the spatial location within the digital image. The parametric lens acuity functional form 303 will have a series of outputs providing a representation of the lens acuity. For example, the representation of the lens acuity can be a parametric representation of the point spread function of the lens. Alternately, the representation of the lens acuity can be a parametric representation of the lens resolving power or the lens MTF. In another embodiment of the present invention, the representation of the lens acuity can be a parametric representation of a sharpening filter that can be used to compensate for the sharpness characteristics of the lens. The parametric lens acuity functional form 303 will also include one or more parameters that must be estimated to determine the parameterized lens acuity representation 207. A determine lens acuity parameters step 304 is used to determine values for these one or more parameters of the parametric lens acuity functional form 303 by fitting them to the training dataset 210. The training dataset 210 provides an indication of lens acuity for the zoom lens determined at a plurality of lens focal lengths and lens F/#s.

Figure 4:
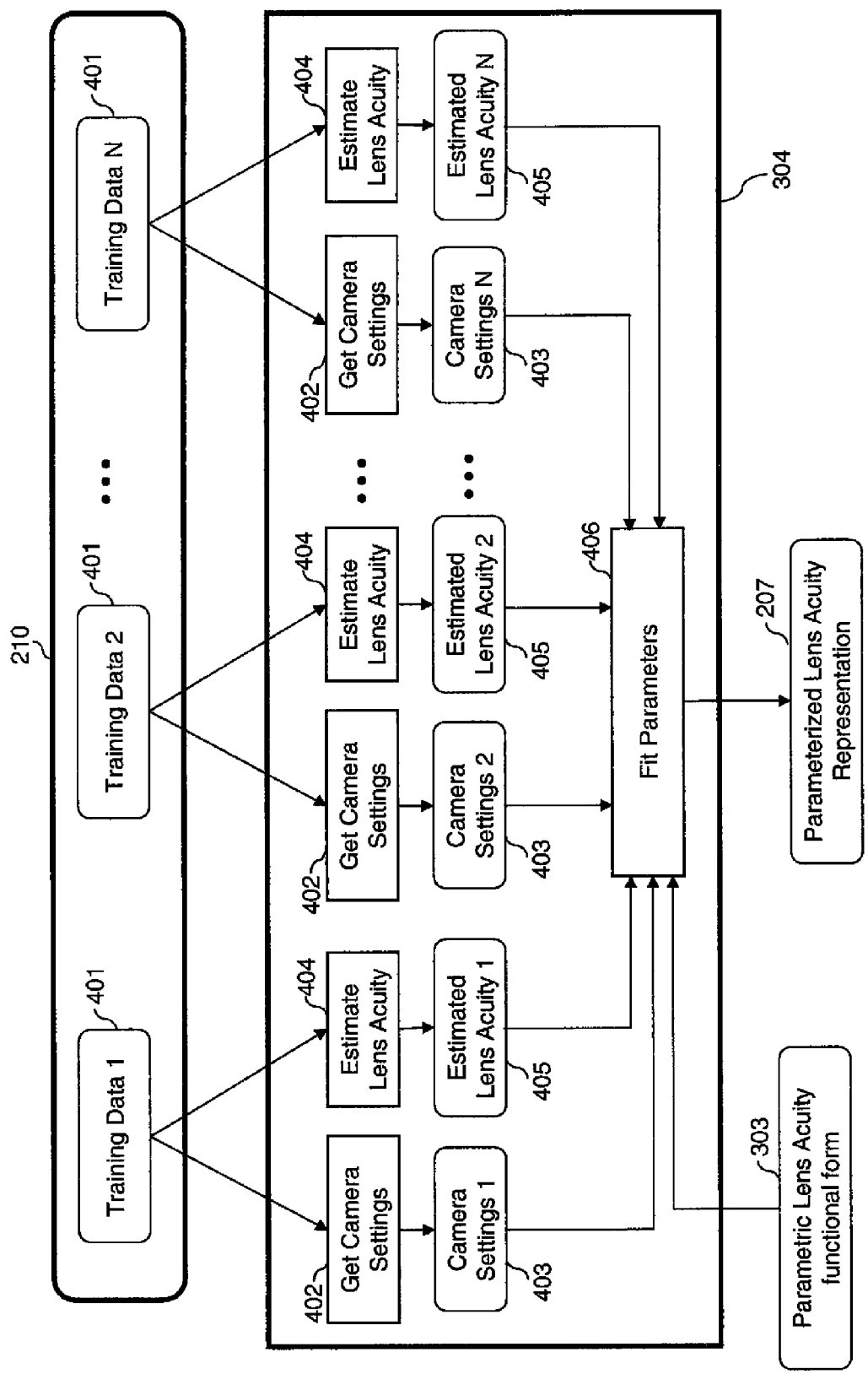
FIG. 4 is a block diagram showing a detailed view of the determine lens acuity parameters step of FIG. 3.

FIG. 4 is a more detailed view of the determine lens acuity parameters step 304 shown in FIG. 3 according to a preferred embodiment of the present invention. The training dataset 210 includes training data 401 for a plurality of camera settings (e.g., lens focal lengths, lens F/#s and focal distance).

A get camera settings step 402 is used to determine camera settings 403 corresponding to each set of training data 401. The camera settings 403 would include quantities such as the lens focal length, lens F/# and focus distance. Additionally, for each set of training data 401, an estimated lens acuity 405 is determined using an estimate lens acuity step 404.

The training data 401 can be generated in any appropriate way known to those skilled in the art. In a preferred embodiment of the present invention, training dataset 210 is generated by capturing images of one or more test targets using a digital camera with a zoom lens at a plurality of camera settings. In this case, the estimate lens acuity step 404 is used to analyze the captured test targets to determine the corresponding representation of lens acuity. For example, a slanted edge target can be analyzed to estimate the lens MTF using methods that are well-known to those skilled in the art.

It is also possible to generate the training data 401 using a lens design software application that models performance of the zoom lens given the lens design formula. In this case, the estimate lens acuity step 404 is used to determine the estimated lens acuity 405 from the output produced by the lens design software application.

A fit parameters step 406 uses the camera settings 403, the estimated lens acuity 405 and the parametric lens acuity functional form 303 to estimate the various parameters of the parametric lens acuity functional form 303. The resulting parameters, together with the parametric lens acuity functional form 303 define the parameterized lens acuity representation 207. In a preferred embodiment of the present invention, the resulting parameterized lens acuity representation 207 is stored in a processor-accessible memory system in the digital camera.

Figure 5:
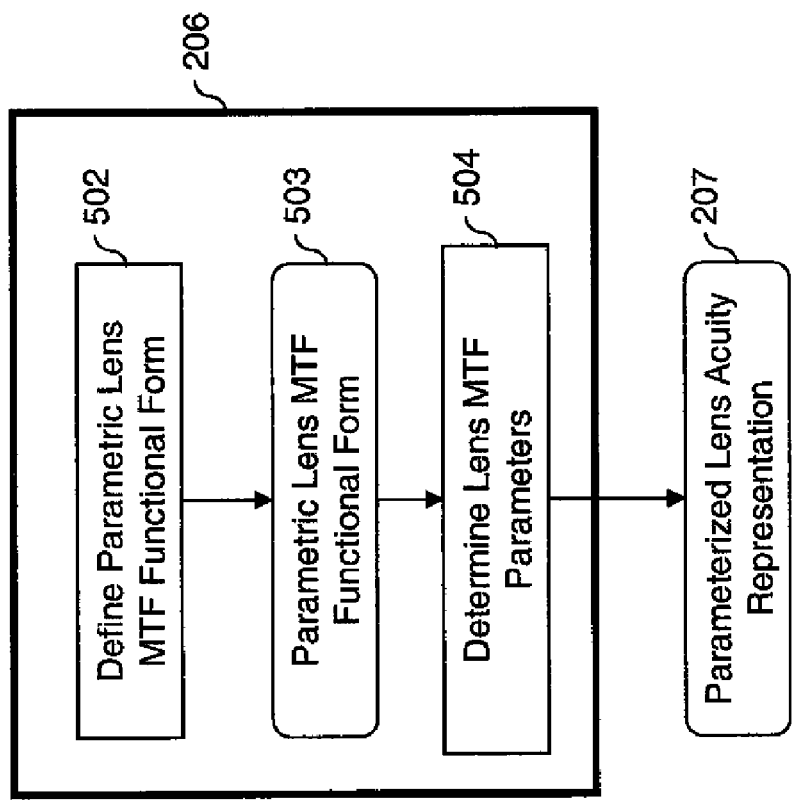
FIG. 5 is a block diagram showing a detailed view of the determine parameterized lens acuity representation step of FIG. 2 for an alternate embodiment of the present invention.

FIG. 5 illustrates a particular embodiment of the determine parameterized lens acuity representation step 206 discussed with reference to FIG. 3 where the lens MTF is used as a representation of the lens acuity. A parametric lens MTF functional form 503 representing the modulation transfer function of the lens is defined in a define parametric lens MTF functional form step 502. The parametric lens MTF functional form 503 can be defined in any appropriate way known to those skilled in the art. In the preferred embodiment of the present invention, the parametric lens MTF functional form 503 is a generalized Gaussian function having two parameters which are functions of lens focal length and lens F/# as given by Eq. (1) below:

$$MTF(v) = \exp\left[-\left(\frac{v}{\sigma}\right)^\alpha\right] \quad (1)$$

where $MTF(v)$ is the lens MTF, $\alpha$ and $\sigma$ are parameters that are a function of lens focal length and the lens F/#, and $v$ is spatial frequency. The parameters $\alpha$ and $\sigma$ can be related to lens focal length and lens F/# in any appropriate way known to those skilled in the art. In the preferred embodiment of the present invention, expressions for $\alpha$ and $\sigma$ are given by Eq. (2) and Eq. (3), respectively, as shown below, each of which includes three additional unknown parameters:

$$\alpha = a_0 + a_1 N + a_2 F \quad (2)$$

$$\sigma = b_0 + b_1 N + b_2 F \quad (3)$$

where N is the lens F/#, F is the lens focal length and $a_0$, $a_1$, $a_2$, $b_0$, $b_1$ and $b_2$ are fitting parameters. A determine lens MTF parameters step 504 estimates the fitting parameters $a_0$, $a_1$, $a_2$, $b_0$, $b_1$ and $b_2$.

Figure 6:
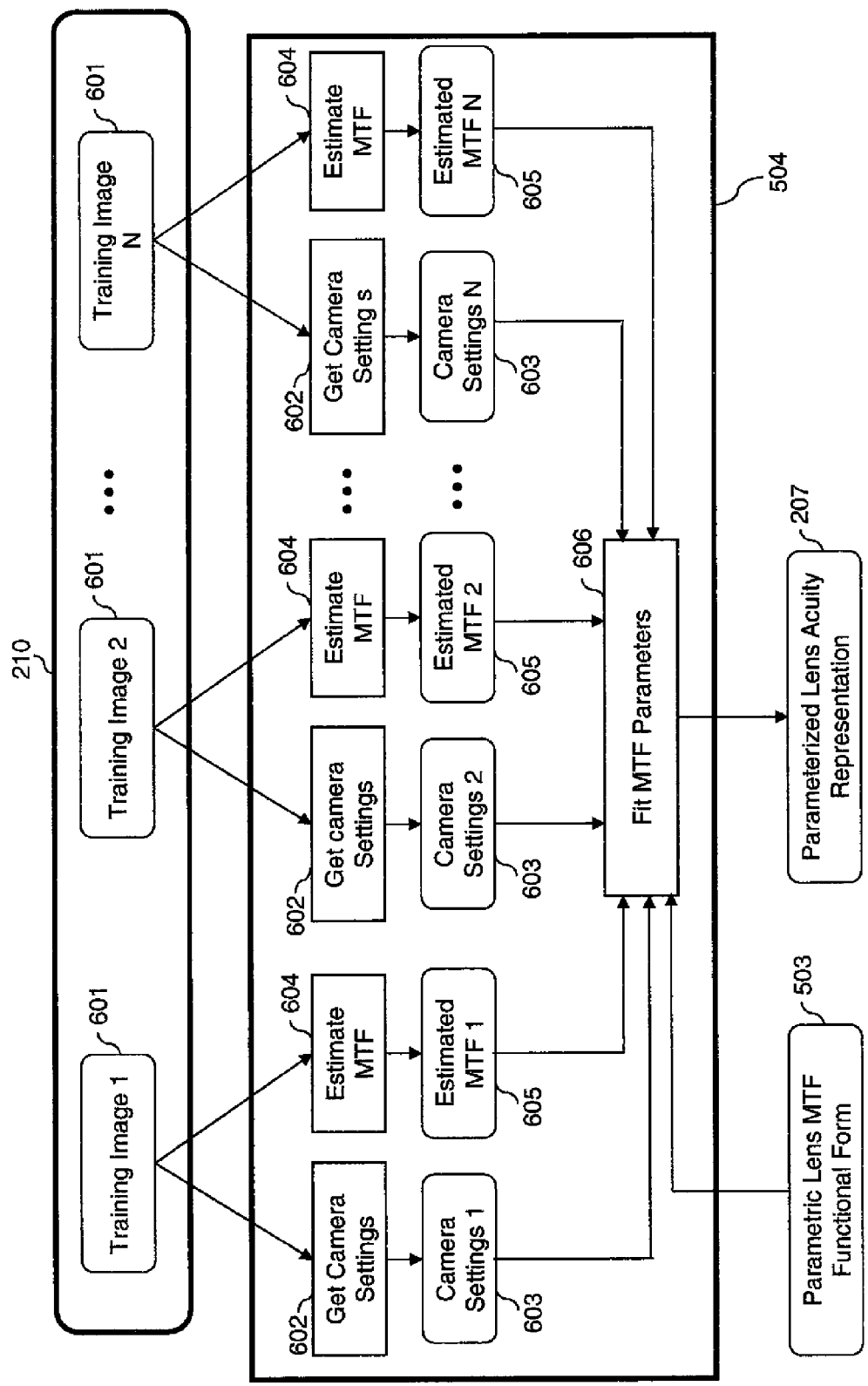
FIG. 6 is a block diagram showing a detailed view of the determine lens MTF parameters step of FIG. 5.

The determine lens MTF parameters step 504 can use any appropriate way known to those skilled in the art to determine the fitting parameters $a_0$, $a_1$, $a_2$, $b_0$, $b_1$ and $b_2$. FIG. 6 is a more detailed view of the determine lens MTF parameters step 504 shown in FIG. 5 according to a preferred embodiment of the present invention. In this case, the training dataset 210 comprises a series of training images 601 captured at a series of different camera settings. The training image 601 can be generated in any appropriate way known to those skilled in the art. In a preferred embodiment of the present invention, the training images 601 are generated by capturing images of one or more test targets using a digital camera having a zoom lens at a plurality of lens focal length and lens F/#. For each training image 601, an estimated MTF 605 representing the lens MTF is determined in an estimate MTF step 604. Camera settings 603 (e.g., lens focal length and F/#) for the each training image 601 are obtained in a get camera settings step 602. In a preferred embodiment, the get camera settings step 602 works by extracting the camera settings 603 from metadata stored in the digital image file for the training image 601. A fit MTF parameters step 606 determines the fitting parameters for the parametric lens MTF functional form 503 by fitting the camera settings 603 and the estimated MTF 605 data. For the example parametric lens MTF functional form 503 given in Eqs. (1)-(3), the fit MTF parameters step 606 applies a curve fitting algorithm to estimate the parameters $a_0$, $a_1$, $a_2$, $b_0$, $b_1$ and $b_2$. If the lens MTF is not rotationally symmetric, then $a_0$, $a_1$, $a_2$, $b_0$, $b_1$ and $b_2$ can be estimated separately for the horizontal and the vertical directions.

Figure 7:
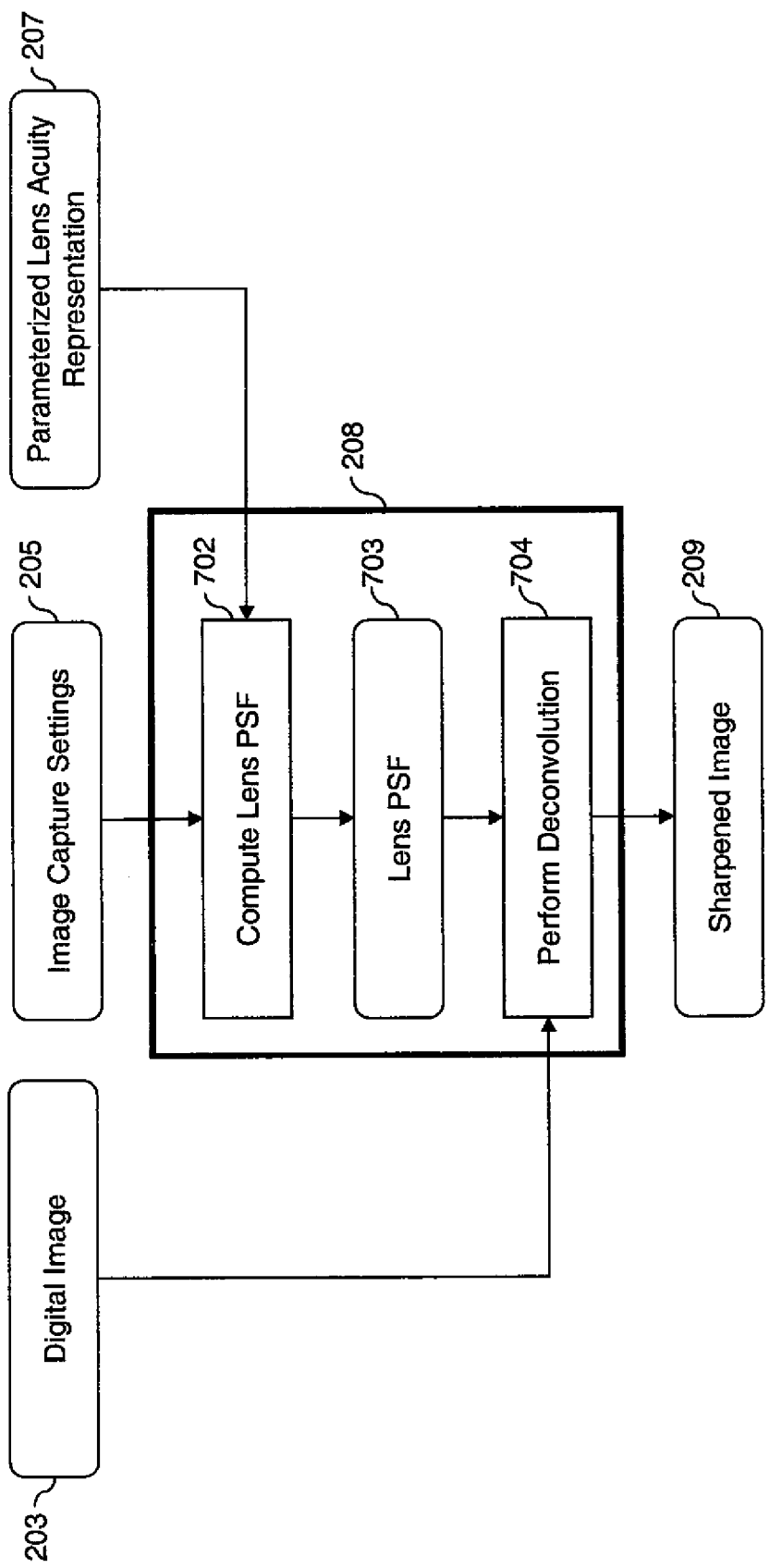
FIG. 7 is a block diagram showing a detailed view of the perform sharpening step of FIG. 2 for a preferred embodiment of the present invention.

FIG. 7 is a more detailed view of the perform sharpening step 208 shown in FIG. 2 according to a preferred embodiment of the present invention. The perform sharpening step 208 sharpens the digital image 203 responsive to the image capture settings 205 and the parameterized lens acuity representation 207 to produce a sharpened image 209. A compute lens point spread function (PSF) step 702 determines a lens PSF 703 for the digital image 203 responsive to the image capture settings 205 and the parameterized lens acuity representation 207.

The compute lens PSF step 702 can be performed in any appropriate way known to those skilled in the art. In a preferred embodiment of the present invention, the lens focal length and the lens F/# specified by the image capture settings 205 are used in Eqs. (1)-(3) to estimate the modulation transfer function MTF(ν). The lens PSF 703 is computed by taking the inverse Fourier transform of MTF(ν). In an alternate embodiment, the parameterized lens acuity representation 207 can be a parameterized representation of the lens PSF rather than the lens MTF. In that case, the lens PSF 703 can be determined directly from the parameterized lens acuity representation 207 without the need to perform an inverse Fourier transform.

A perform deconvolution step 704 uses the digital image 203 and the lens PSF 703 to produce the sharpened image 209 using any deconvolution algorithm known in the art. In one embodiment of the present invention, a Wiener filter deconvolution algorithm is used to produce the sharpened image 209. In a preferred embodiment, a Richardson-Lucy deconvolution algorithm was used to produce the sharpened image 209. Details of the Wiener filter and the Richardson-Lucy algorithms can be found in the book "Digital Image Processing Using MATLAB" by Gonzalez et al. (Pearson Prentice Hall, Upper Saddle River, N.J., 2004).

Figure 8:
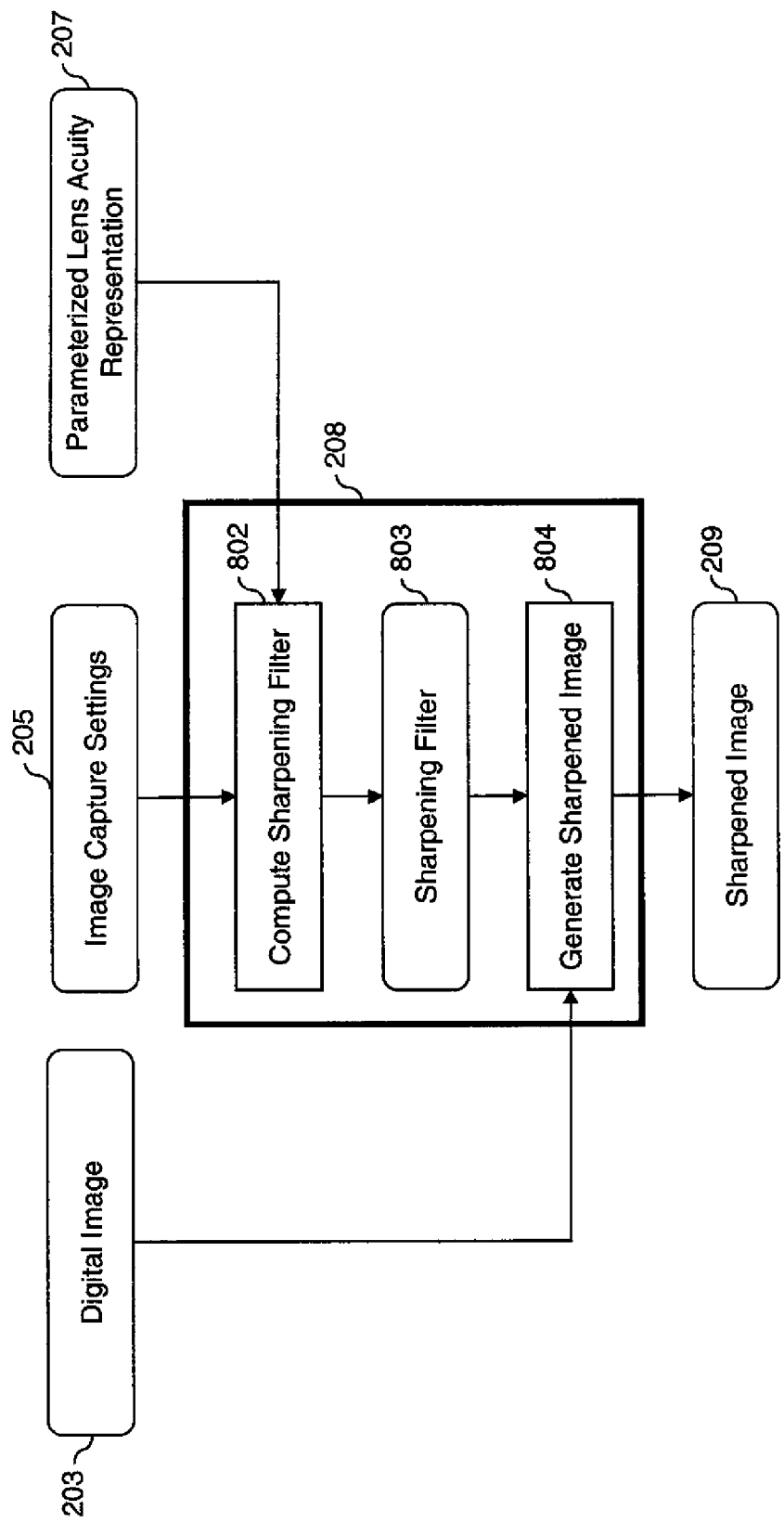
FIG. 8 is a block diagram showing a detailed view of the perform sharpening step of FIG. 2 for an alternate embodiment of the present invention.

FIG. 8 shows an alternate embodiment of the perform sharpening step 208 (FIG. 2). In this embodiment, a compute sharpening filter step 802 determines a sharpening filter 803 responsive to the image capture settings 205 and the parameterized lens acuity representation 207. For the case where the parameterized lens acuity representation 207 is a representation of the lens MTF as described above with reference to FIG. 5, the sharpening filter 803 is determined by determining a sharpness filter appropriate to compensate for the sharpness degradations associated with the lens MTF corresponding to the particular image capture settings 205. Simplistically, a sharpening filter 803 that compensates for the lens MTF by applying the inverse of the lens MTF can be determined using the equation:

$$H(v_x, v_y) = \frac{1}{MTF(v_x, v_y)} \qquad (4)$$

where $H(v_x, v_y)$ is the frequency response of the sharpening filter 803 and $v_x$ and $v_y$ are x and y spatial frequencies, respectively. However, sharpening filters computed in this way are often problematic for frequencies where the MTF gets small. It is generally preferable to compute the sharpening filter 803 using the well-known Wiener filter:

$$H(v_x, v_y) = \frac{MTF(v_x, v_y)}{|MTF(v_x, v_y)|^2 + S_n(v_x, v_y)/S_i(v_x, v_y)} \qquad (5)$$

where $S_n(v_x, v_y)$ is the noise power spectrum and $S_n(v_x, v_y)$ is the signal power spectrum.

Often, it will be desirable to apply the sharpening filter 803 to the digital image 203 using a spatial convolution operation. A sharpening filter h(x,y) that provides a desired frequency response can be determined by computing the inverse Fourier transform of the desired frequency response:

$$h(x,y) = \mathcal{F}^{-1}\{H(v_x, v_y)\} \qquad (6)$$

where $\mathcal{F}^{-1}\{\bullet\}$ is the inverse Fourier transform operator. It will often be desirable to use convolution filters having a limited spatial extent for purposes of efficient computation. Those skilled in the art will be familiar with methods for determining coefficients for a convolution filter of a specified spatial extent that approximate a specified frequency response.

Once the sharpening filter 803 has been determined, a generate sharpened image step 804 applies the sharpening filter 803 to the digital image 203 to produce the sharpened image 209 as described using Eq. (7) below:

$$I_S(x,y) = I_O(x,y) * h(x,y) \qquad (7)$$

where "*" is a convolution operator, $I_S(x, y)$, $I_O(x, y)$ and h(x, y) are the sharpened image 209, the digital image 203 and the sharpening filter 803, respectively, and (x, y) denotes the spatial location.

In an alternate embodiment, the parameterized lens acuity representation 207 can store a parameterized representation of a sharpening filter 803, thus eliminating the need to compute the sharpening filter 803 from the lens MTF.

Figure 9:
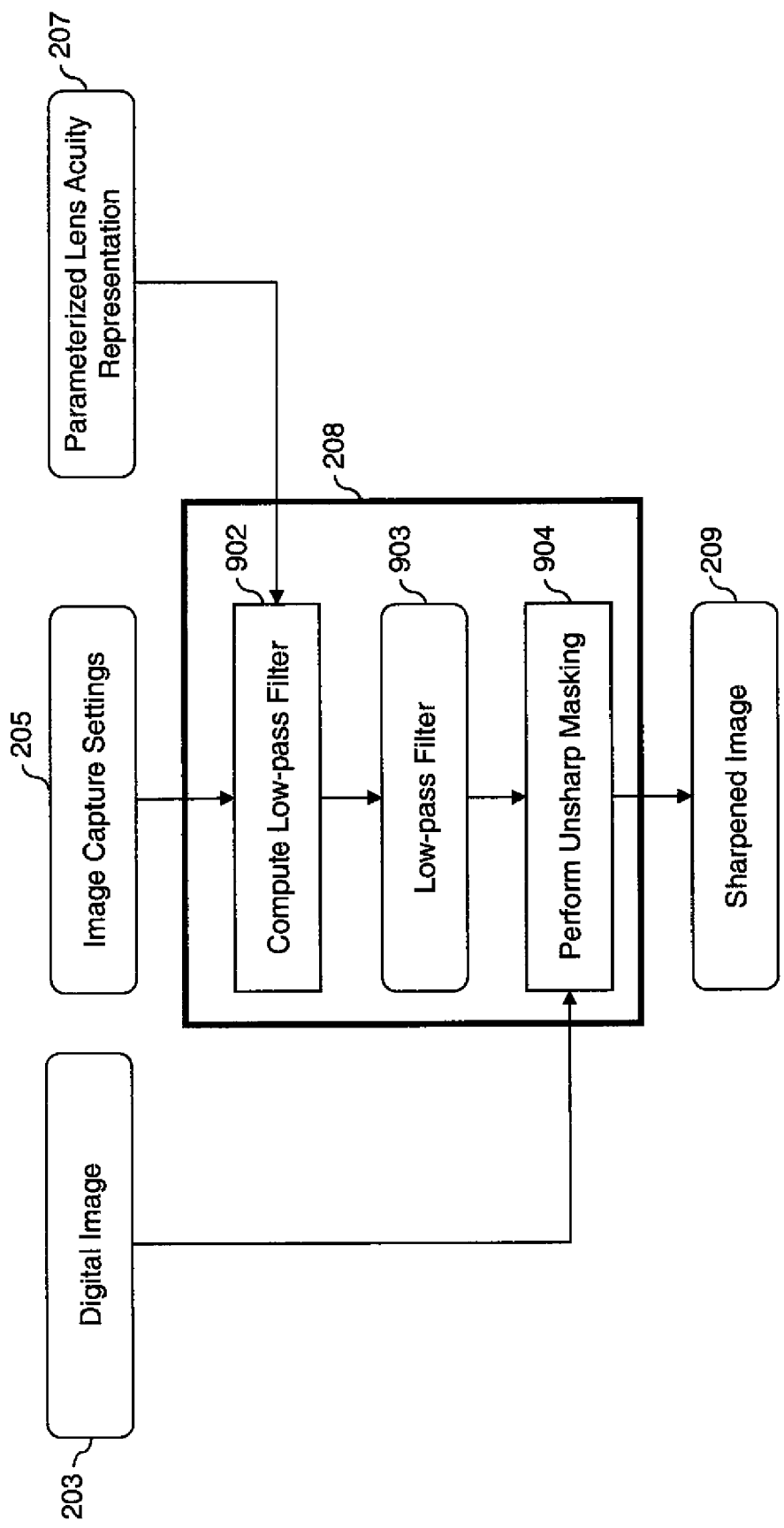
FIG. 9 is a block diagram showing a detailed view of the perform sharpening step of FIG. 2 for another alternate embodiment of the present invention.

FIG. 9 shows an alternate embodiment of the perform sharpening step 208 (FIG. 2) which sharpens the digital image 203 using an unsharp masking operation. In this embodiment, a compute low-pass filter step 902 uses the image capture settings 205 and the parameterized lens acuity representation 207 to determine a low-pass filter 903. The low-pass filter 903, together with a non-negative weighting constant α can be determined from the lens MTF using methods well-known to those skilled in the art in order to produce an appropriate sharpening result.

A perform unsharp masking step 904 applies an unsharp masking operation to the digital image 203 using the low-pass filter 903 to produce the sharpened image 209 as described using Eq. (8) below:

$$I_s(x, y) = I_o(x, y) + \alpha[I_o(x, y) - I_o(x, y) * g(x, y)] \qquad (8)$$
$$= (1 + \alpha)I_o(x, y) - \alpha(I_o(x, y) * g(x, y))$$

where "*" is a convolution operator, $I_S(x, y)$, $I_O(x, y)$ and g(x, y) are the sharpened image 209, the digital image 203 and the low-pass filter 903, respectively, α is the non-negative weighting constant and (x, y) denotes the spatial location.

In an alternate embodiment, the parameterized lens acuity representation 207 can store a parameterized representation of the low-pass filter 903 and the non-negative weighting constant α, thus eliminating the need to compute them from the lens MTF.

In the case where the parameterized lens acuity representation 207 is also a function of spatial location within the captured digital image, the digital image 203 is first segmented into small regions such that the parameterized lens acuity is approximately independent of the spatial location within each region. The perform sharpening step 208 discussed above can then be applied within each region using the appropriate lens acuity.

In one embodiment of the present invention, the perform sharpening step 208 of FIG. 2 is implemented in a processor internal to the digital camera used to capture the digital image 203. The resulting sharpened image 209 can then be stored in a processor-accessible memory internal to the digital camera (e.g., an SD memory card) for viewing or downloading at a later time.

Alternately, a processor external to the digital camera can be used to apply the perform sharpening step 208 at a later time. In this case, the parameterized lens acuity representation 207 can be saved in a processor-accessible memory located inside or the outside of the camera. The captured digital image 203 is stored in a digital image file. The lens focal length, lens F/# and any other relevant image capture settings 205 are stored as metadata in the digital image file. The digital image file can then be downloaded to an external processor, such as a personal computer or a network server, to apply the perform sharpening step 208.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

110 Data processing system
120 Peripheral system
130 User interface system
140 Data storage system
202 Receive digital image step
203 Digital image
204 Receive image capture settings step
205 Image capture settings
206 Determine parameterized lens acuity representation step
207 Parameterized lens acuity representation
208 Perform sharpening step
209 Sharpened image
210 Training dataset
302 Define parametric lens acuity functional form step
303 Parametric lens acuity functional form
304 Determine lens acuity parameters step
401 Training data
402 Get camera settings step
403 Camera settings
404 Estimate lens acuity step
405 Estimated lens acuity
406 Fit parameters step
502 Define parametric lens MTF functional form step
503 Parametric lens MTF functional form
504 Determine lens MTF parameters step
601 Training image
602 Get camera settings step
603 Camera settings
604 Estimate MTF step
605 Estimated MTF
606 Fit MTF parameters step
702 Compute lens PSF step
703 Lens PSF
704 Perform deconvolution step
802 Compute sharpening filter step
803 Sharpening filter
804 Generate sharpened image step
902 Compute low-pass filter step
903 Low-pass filter
904 Perform unsharp masking step

The invention claimed is:

1. A method for sharpening an input digital image captured using a digital camera having a zoom lens, comprising:
    a) determining a parameterized representation of lens acuity for the zoom lens as a function of at least the lens focal length and the lens F/# by fitting a parameterized function to lens acuity data for the zoom lens at a plurality of lens focal lengths and lens F/#s;
    b) using the digital camera to capture a digital image of a scene at a particular lens focal length and lens F/#;
    c) using a processor to sharpen the captured digital image responsive to the particular lens focal length and lens F/# using the parameterized representation of the lens acuity; and
    d) storing the sharpened digital image in a processor-accessible memory system.

2. The method of claim 1 wherein the parameterized representation of lens acuity is a parameterized representation of a modulation transfer function for the zoom lens.

3. The method of claim 2 wherein the parameterized representation of a modulation transfer function for the zoom lens is not rotationally symmetric.

4. The method of claim 2 wherein the parameterized representation of a modulation transfer function for the zoom lens is a generalized Gaussian function having at least one parameter which is a function of at least the lens focal length and the lens F/#.

5. The method of claim 4 wherein the generalized Gaussian function is of the form:

$$MTF(v, \alpha, \sigma) = \exp\left[-\left(\frac{v}{\sigma}\right)^\alpha\right]$$

where $\alpha$ and $\sigma$ are parameters that are a function of at least the lens focal length and the lens F/#, and $v$ is spatial frequency.

6. The method of claim 5 wherein:

$$\alpha = a_0 + a_1 N + a_2 F$$

and $$\sigma = b_0 + b_1 N + b_2 F$$

where N is the lens F/#, F is the lens focal length and $a_0$, $a_1$, $a_2$, $b_0$, $b_1$ and $b_2$ are fitting parameters.

7. The method of claim 1 wherein the parameterized representation of lens acuity is a parameterized representation of a point spread function for the zoom lens.

8. The method of claim 1 wherein the parameterized representation of lens acuity is a parameterized representation of a resolving power for the zoom lens.

9. The method of claim 1 wherein the parameterized representation of lens acuity is a parameterized representation of coefficients for a sharpening function appropriate to compensate for sharpness characteristics of the zoom lens.

10. The method of claim 1 wherein step c) includes:
    i) computing a sharpening filter responsive to the particular lens focal length and lens F/# using the parameterized representation of the lens acuity; and
    ii) convolving the captured digital image with the sharpening filter.

11. The method of claim 1 wherein step c) includes:
    i) computing a low-pass filter responsive to the particular lens focal length and lens F/# using the parameterized representation of the lens acuity; and
    ii) sharpening the captured digital image using an unsharp mask algorithm responsive to the computed low-pass filter.

12. The method of claim 1 wherein step c) includes:
    i) determining a lens point spread function responsive to the particular lens focal length and lens F/# using the parameterized representation of the lens acuity; and
    ii) sharpening the captured digital image using a deconvolution algorithm responsive to the determined lens point spread function.

13. The method of claim 12 wherein the deconvolution algorithm is a Wiener filter algorithm or a Richardson-Lucy algorithm.

14. The method of claim 1 wherein the parameterized representation of the lens acuity is also a function of the focus distance.

15. The method of claim 1 wherein the parameterized representation of the lens acuity is also a function of spatial location within the captured digital image.

16. The method of claim 15 wherein the sharpening applied to the captured digital image varies as a function of spatial location within the captured digital image.

17. The method of claim 1 wherein the lens acuity data that is fit to determine the parameterized representation of lens acuity is obtained by performing lens acuity measurements for the zoom lens at a plurality of lens focal lengths and lens F/#s.

18. The method of claim 17 wherein the lens acuity measurements are performed by capturing digital images of one or more test targets and analyzing the captured digital images to estimate the lens acuity.

19. The method of claim 1 wherein the lens acuity data that is fit to determine the parameterized representation of lens acuity is generated by using a lens design software application to model performance of the zoom lens at a plurality of lens focal lengths and lens F/#s.

20. The method of claim 1 wherein parameters associated with the parameterized representation of the lens acuity are stored in a processor-accessible memory system in the digital camera.

21. The method of claim 1 and wherein a processor internal to the digital camera is used to perform the sharpening step.

22. The method of claim 1 wherein the captured digital image is stored in a digital image file and the lens focal length and lens F/#are stored as metadata in the digital image file, and wherein the sharpening step is applied at a later time responsive to the stored metadata.

23. The method of claim 22 wherein the processor used to perform the sharpening step is external to the digital camera.

24. A digital camera system comprising:
an image sensor for capturing an image of a scene;
a zoom lens system for imaging the scene onto the image sensor;
a processor-accessible memory system storing a parameterized representation of lens acuity for the zoom lens as a function of at least the lens focal length and the lens F/# determined by fitting a parameterized function to lens acuity data for the zoom lens at a plurality of lens focal lengths and lens F/#s;. and
a data processing system for performing the steps of:
receiving a digital image of a scene captured at a particular lens focal length and lens F/#;
sharpening the captured digital image responsive to the particular lens focal length and lens F/# using the stored parameterized representation of the lens acuity; and
storing the sharpened digital image in the processor-accessible memory system.

* * * * *